(12) United States Patent
Lai

(10) Patent No.: US 10,940,665 B2
(45) Date of Patent: Mar. 9, 2021

(54) STRUCTURAL PANEL, A STRUCTURAL SYSTEM AND A METHOD OF FORMING A STRUCTURAL PANEL

(71) Applicant: City University of Hong Kong, Kowloon (HK)

(72) Inventor: Ki Leuk Joseph Lai, Kowloon (HK)

(73) Assignee: City University of Hong Kong, Kowloon (HK)

( * ) Notice: Subject to any disclaimer, the term of this patent is extended or adjusted under 35 U.S.C. 154(b) by 106 days.

(21) Appl. No.: 15/097,557

(22) Filed: Apr. 13, 2016

(65) Prior Publication Data

US 2017/0297291 A1    Oct. 19, 2017

(51) Int. Cl.
| | | |
|---|---|---|
| B32B 3/20 | (2006.01) | |
| B32B 7/14 | (2006.01) | |
| E01C 5/16 | (2006.01) | |
| B32B 15/04 | (2006.01) | |
| B32B 15/18 | (2006.01) | |

(Continued)

(52) U.S. Cl.
CPC .................. *B32B 3/20* (2013.01); *B32B 7/12* (2013.01); *B32B 7/14* (2013.01); *B32B 15/016* (2013.01); *B32B 15/04* (2013.01); *B32B 15/18* (2013.01); *B32B 15/20* (2013.01); *B64C 1/06* (2013.01); *B64C 1/12* (2013.01); *E01C 5/006* (2013.01); *E01C 5/16* (2013.01); *E04C 2/34* (2013.01); *B32B 2250/40* (2013.01); *B32B 2255/06* (2013.01); *B32B 2255/24* (2013.01); *B32B 2307/50* (2013.01); *B32B 2307/732* (2013.01); *B32B 2419/00* (2013.01); *B32B 2605/18* (2013.01); *B32B 2607/00* (2013.01);

*B64C 2001/0081* (2013.01); *E04C 2002/001* (2013.01); *E04C 2002/3477* (2013.01); *Y10T 428/1234* (2015.01)

(58) Field of Classification Search
CPC ................................................ Y10T 428/1234
See application file for complete search history.

(56) References Cited

U.S. PATENT DOCUMENTS

| | | | | |
|---|---|---|---|---|
| 2,369,006 A | * | 2/1945 | Banks | B63C 9/08 |
| | | | | 156/197 |
| 2,794,788 A | * | 6/1957 | Coover, Jr. | C07C 255/00 |
| | | | | 156/153 |

(Continued)

OTHER PUBLICATIONS

Gutu, A Study on the Mechanical Strength Properties of Bamboo to enhance Its Diversification on Its Utilization, Apr. 2013, International Journal of Innovative Technology and Exploring Engineering (IJITEE), ISSN: 2278-3075, vol. 2 Issue 5, pp. 314-319 (6 pages). (Year: 2013).*

(Continued)

*Primary Examiner* — Adam Krupicka
(74) *Attorney, Agent, or Firm* — Renner Kenner Greive Bobak Taylor & Weber

(57) ABSTRACT

A system and method of a structural panel includes a first outer sheet and a second outer sheet, the first outer sheet and second outer sheet including a polygon shape; a core arrangement sandwiched between the first outer sheet and the second outer sheet, the core arrangement comprising two or more discrete members arranged adjacent each other, the discrete members shaped or structured to reduce crack initiation and propagation within the core arrangement.

23 Claims, 6 Drawing Sheets

(51) Int. Cl.
*B32B 15/20* (2006.01)
*B64C 1/06* (2006.01)
*B32B 7/12* (2006.01)
*B32B 15/01* (2006.01)
*B64C 1/12* (2006.01)
*E01C 5/00* (2006.01)
*E04C 2/34* (2006.01)
*B64C 1/00* (2006.01)
*E04C 2/00* (2006.01)

(56) References Cited

U.S. PATENT DOCUMENTS

| | | | | |
|---|---|---|---|---|
| 3,123,907 | A * | 3/1964 | Thomas | B21D 47/00 |
| | | | | 156/197 |
| 3,228,822 | A * | 1/1966 | Norman | E04C 2/34 |
| | | | | 428/188 |
| 3,256,669 | A | 6/1966 | Seiwert | |
| 3,526,953 | A * | 9/1970 | Levinstein | B23K 31/02 |
| | | | | 228/178 |
| 3,743,568 | A * | 7/1973 | Wolf | B65D 65/403 |
| | | | | 428/178 |
| 3,834,881 | A * | 9/1974 | Niebylski | B32B 15/00 |
| | | | | 428/613 |
| 4,172,916 | A | 10/1979 | Watson | |
| 5,028,371 | A | 7/1991 | Bach | |
| 6,352,671 | B1 * | 3/2002 | Daech | C22C 21/06 |
| | | | | 420/542 |
| 6,497,082 | B1 | 12/2002 | Toyoda et al. | |
| 2002/0012767 | A1 | 1/2002 | Ueda et al. | |
| 2007/0148412 | A1 | 6/2007 | Akishev et al. | |

OTHER PUBLICATIONS

Pirate 4x4.com, https://www.pirate4x4.com/threads/chopsaw-notching-tube-strength-link-construction-tech-article-by-billavista-pirate4x4x-com2702751/#post-44988334, captured Sep. 2020 (Year: 2020).*

* cited by examiner

STRUCTURAL PANEL, A STRUCTURAL SYSTEM AND A METHOD OF FORMING A STRUCTURAL PANEL

TECHNICAL FIELD

The present disclosure relates to a structural panel, in particular a multi-layer structural panel that is a sandwich structure. The present disclosure relates to a structural system that comprises a plurality of structural panels coupled together, and the present disclosure also relates to a method of forming a structural panel.

BACKGROUND

Structural panels are commonly used in a wide range of applications such as construction, architectural applications, road construction, aerospace and aircraft industries and the like.

Aluminum sandwich panels are an example of structural panels that are commonly used. Aluminum sandwich panels are widely used in transport and architectural applications due to their enhanced stiffness to weight ratio compared to a solid monolithic aluminum sheets or blocks. A typical example of an aluminum sandwich panel consists of two aluminum sheets with a honeycomb core.

Such a panel is an efficient design since it provides rigidity while minimizing weight of the panel. However honeycomb structures and panels that include honeycomb cores are expensive to produce. Due to the added expense and light weight nature of aluminum panels with a honeycomb core, such panels are used in specialist industries such as aerospace and aircraft industries, where the primary design driver is reducing weight.

In other applications various other core structures are used. Some examples of other core structures such as corrugated sheets and ribbons are used as cheaper alternatives to the honeycomb core panel. Alternative structural panels and structural systems that comprise multiple structural panels are sought to address problems with current structural panels or at least provide the public with a useful alternative.

SUMMARY OF THE PRESENT INVENTION

In accordance with a first aspect, the present disclosure is directed to a structural panel that comprises;
- a first outer sheet and a second outer sheet, the first outer sheet and second outer sheet comprise a polygon shape.
- a core arrangement sandwiched between the first outer sheet and the second outer sheet,
- the core arrangement comprising two or more discrete members arranged adjacent each other, the discrete members shaped or structured to reduce crack initiation and propagation within the core arrangement.

In some configurations the core arrangement is structured to reduce the number of stress concentration locations within the core arrangement.

In some configurations the two or more discrete members are shaped and structured to provide mechanical stiffness to the panel and the panel being substantially crack propagation resistant.

In some configurations the core arrangement comprises a plurality of layers of discrete members, the core arrangement comprises at least a first layer of discrete members and at least a second layer of discrete members, the first layer of discrete members being stacked on top of the second layer of discrete members.

In some configurations the discrete members are elongate tubes, the tubes being identical to each other and are cylindrical in shape, and the first and second sheets are rectangular in shape, and the tubes comprise a circular cross section.

In some configurations the first outer sheet and second outer sheet are formed from a metal or metal alloy and the tubes are formed from a metal or metal alloy.

In some configurations the first outer sheet, the second outer sheet and the tubes are formed from aluminum or an aluminum alloy.

In some configurations the first outer sheet, the second outer sheet and the tubes are formed from a grade 1100 aluminum alloy in the "O" temper annealed condition.

In some configurations the first outer sheet and second outer sheet have a thickness of between 0.2 mm to 0.7 mm, the first outer sheet and second outer sheet comprise a constant thickness.

In some configurations the tubes comprise an outer cross sectional diameter between 0.5 mm and 5.5 mm, the tubes comprise a wall thickness between 0.15 mm and 0.6 mm, the tube comprises a constant wall thickness.

In some configurations the tubes are connected to each other, the tubes are further connected to the first outer sheet and the second outer sheet.

In some configurations the tubes are connected together by an acrylic based adhesive, the tubes are connected to the first outer sheet and second outer sheet by an acrylic based adhesive, the adhesive is applied in the form of spots having a diameter of 0.5 mm to 3.5 mm, the adhesive spots being evenly spaced on the tubes.

In some configurations the acrylic based adhesive is ethyl 2-cyanoacrylate.

In accordance with a second aspect, the present disclosure is directed to a structural system comprising;
- two or more structural panels, one or more couplers coupling the two or more structural panels together,
- each structural panel comprising a first outer sheet, a second outer sheet, and a core arrangement sandwiched between the first and second outer sheet,
- the core arrangement comprising two or more discrete members arranged adjacent each other, the discrete members shaped or structured to reduce crack initiation and propagation within the core arrangement.

In some configurations the core arrangement comprises a plurality of layers of discrete members, the core arrangement comprises at least a first layer of discrete members and at least a second layer of discrete members, the first layer of discrete members being stacked on top of the second layer of discrete members.

In some configurations the discrete members are elongate tubes, the tubes being identical to each other and are cylindrical in shape, and the first and second sheets are rectangular in shape, and the tubes comprise a circular cross section.

In some configurations the first outer sheet and second outer sheet have a thickness of between 0.2 mm to 0.7 mm, the first outer sheet and second outer sheet comprise a constant thickness, the tubes comprise an outer cross sectional diameter between 0.5 mm and 5.5 mm, the tubes comprise a wall thickness between 0.15 mm and 0.6 mm, the tube comprises a constant wall thickness.

In some configurations the one or more couplers are configured to interconnect the core arrangement of a first structural panel with the core arrangement of a second structural panel, the couplers are bonded to each core arrangement by an adhesive.

In some configurations the one or more couplers are coupling tubes, each coupling tube corresponds to a tube within the core arrangement of the first structural panel and the core arrangement of the second structural panel, each coupling tube is inserted into a tube of the core arrangement of the first structural panel and inserted into a tube of the core arrangement from the second structural panel, such that the first and second structural panels are coupled together.

In some configurations the coupling tubes comprise a circular cross section, wherein the outer diameter of the coupling tubes is smaller than the inner diameter of the tubes of the core arrangement of the first structural panel, and the outer diameter of the coupling tubes is smaller than the inner diameter of the tubes of the core arrangement of the second structural panel.

In some configurations the structural panel is of a configuration described as per any one of the embodiments of the first aspect.

In an embodiment the coupling tubes are angled, the angled coupling tubes are configured to couple the first structural panel and the second structural panel at an angle to each other.

In accordance with a third aspect, the present disclosure relates to a method of forming a structural panel comprising;
providing a first outer sheet,
providing a second outer sheet,
providing a core arrangement, the core arrangement comprising a plurality of tubes, the tubes being bonded to each other, and the tubes being bonded to the first outer sheet and a second outer sheet,
the structural assembly the core arrangement is structured to reduce the number of stress concentration locations within the core arrangement the plurality of tubes shaped and structured to provide mechanical stiffness to the structural system and the structural system being substantially crack propagation resistant.

In some configurations the method further comprises; forming the first outer sheet, forming the second outer sheet, and forming the plurality of tubes.

In some configurations the first outer sheet and the second outer sheet are formed by a rolling process, and the plurality of tubes are formed by a drawing or extrusion process.

In some configurations the method comprises bonding each tube of the plurality of tubes to one or more adjacent tubes, bonding each tube of the plurality of tubes to the first outer sheet and bonding each tube of the plurality of tubes to the second outer sheet.

In accordance with a fourth aspect, the present disclosure relates to a core arrangement of a structural panel comprising;
a plurality of elongate, hollow tubes arranged adjacent each other, the tubes being bonded to each other,
the tubes are arranged in one or more layers, the tubes having a circular cross section.

In some configurations the tubes comprise an outer cross sectional diameter between 0.5 mm and 5.5 mm, the tubes comprise a wall thickness between 0.15 mm and 0.6 mm, the tube comprises a constant wall thickness, and the tubes being cylindrical in shape.

In some configurations the core arrangement comprises a first layer of tubes and a second layer of tubes, the first layer of tubes arranged perpendicular to the second layer of tubes, and wherein the first layer of tubes being bonded to the second layer of tubes with an adhesive.

In another aspect of the present invention, there is provided a method of forming a structural panel comprising;
providing a first outer sheet,
providing a second outer sheet,
providing a core arrangement, the core arrangement comprising a plurality of tubes, the tubes being bonded only to the outer sheets but not to each other.
the structural assembly and the core arrangement are structured to reduce the number of stress concentration locations within the core arrangement, the plurality of tubes shaped and structured to provide mechanical stiffness to the structural system and the structural system being substantially crack propagation resistant.

In an embodiment, the method further comprises; forming the first outer sheet, forming the second outer sheet, and forming the plurality of tubes.

In an embodiment, the method comprises bonding each tube of the plurality of tubes to one or more adjacent tubes, bonding each tube of the plurality of tubes to the first outer sheet and bonding each tube of the plurality of tubes to the second outer sheet.

In accordance with another aspect of the present invention, there is provided a core arrangement of a structural panel comprising;
a plurality of elongate, hollow tubes arranged adjacent and bonded to the outer sheets and are arranged in one or more layers with each tube having a circular cross section.

In an embodiment, the tubes comprise an outer cross sectional diameter between 0.5 mm and 5.5 mm, the tubes comprise a wall thickness of 0.15 mm and 0.6 mm, the tube comprises a constant wall thickness, and the tubes being cylindrical in shape.

In an embodiment, the core arrangement comprises a first layer of tubes and a second layer of tubes, the first layer of tubes arranged perpendicular or at an angle to the second layer of tubes, and wherein the first layer of tubes being bonded to the second layer of tubes with an adhesive.

The term "comprising" (and its grammatical variations) as used herein are used in the inclusive sense of "having" or "including" and not in the sense of "consisting only of". Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to."

DETAILED DESCRIPTION OF THE PREFERRED EMBODIMENT

Figure 1:
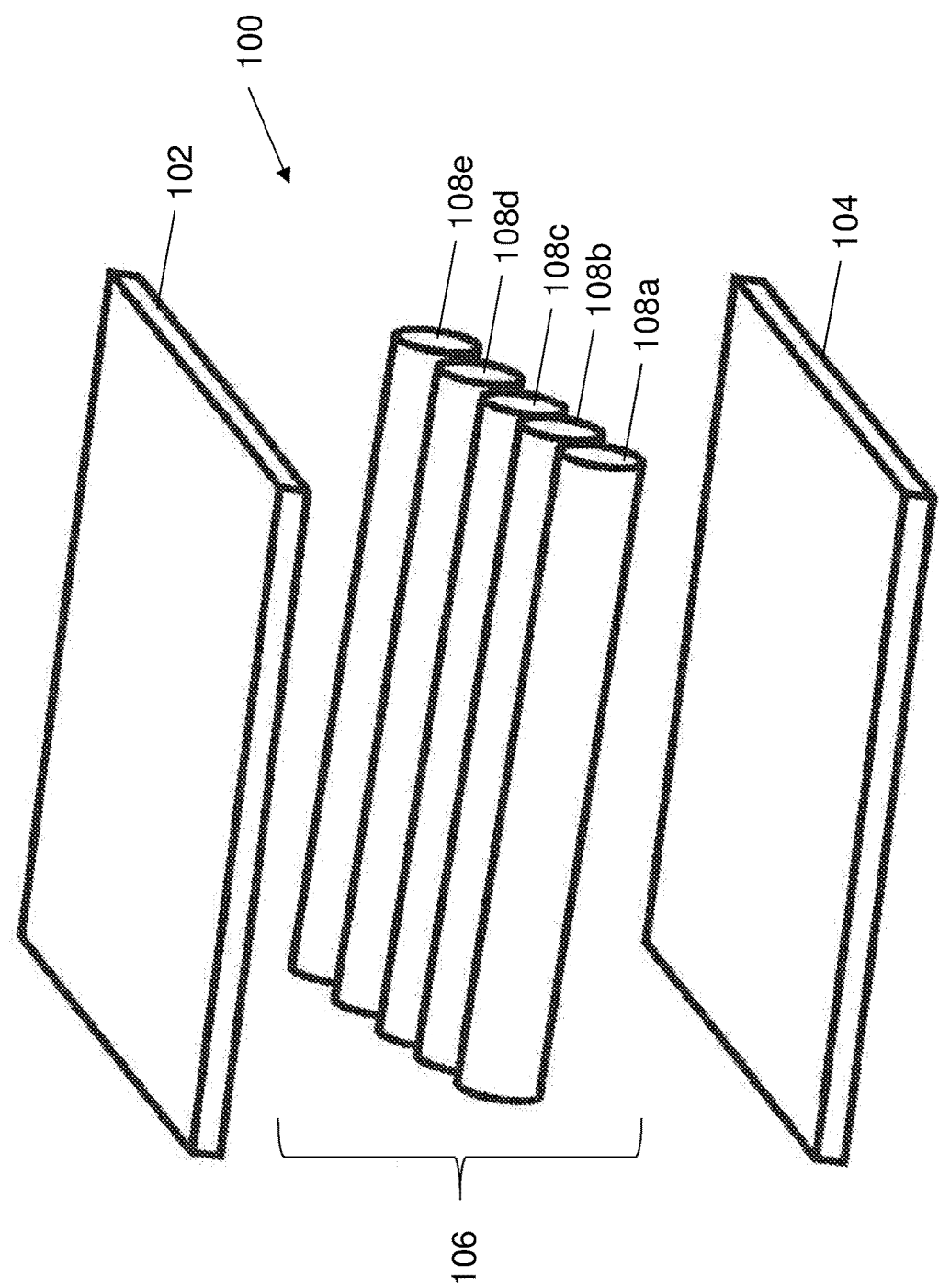
FIG. 1 shows an exploded view of an embodiment of a structural panel.

The present disclosure is directed to a structural panel, a structural system and a method of forming a structural panel. The structural panel is a multi-layer sandwich panel that comprises a pair of outer elements and a core arrangement positioned between the outer elements. The outer elements are in the form of sheets. The structural system comprises a plurality of structural panels that are coupled together to provide a system for use in various industries.

As described earlier aluminum sandwich panels are commonly used in construction, aerospace, aircraft, road construction, architectural applications and other industries.

With the advancement in stress analysis techniques over the years, the stress on modern engineering components under normal operating conditions can be accurately calculated. As a result, failures due to overloading exceeding the design limit become less common. On the other hand, crack initiation and propagation may still occur at locations with elevated stress concentration, particularly when they happen to coincide with material defects such as inclusion particles. This type of failure is notoriously insidious and difficult to detect because it can occur at loading conditions well below the design level. Moreover, material and prototype testing may not reveal the problem as many types of material defects appear randomly in the material and may not happen to be located at the elevated stress concentration sites in the test samples. For rigid structures such as the aluminum honeycomb sandwich, the stress concentration ahead of the crack tip is very high due to the structure's rigid constraint which prevents the relaxation of stress at the crack tip by plastic deformation. Crack propagation in such situations may proceed insidiously before final catastrophic failure.

In aluminum sandwich panels stress concentration may arise from geometry or microstructural inhomogeneities. Sharp corners in honeycomb core panels are sites of geometrical stress concentration. On the other hand, bending operations in the forming of corrugated sheets or ribbons will produce microstructural inhomogeneities leading to sites of stress concentration due to local changes in material properties.

For critical structural applications, failures due to excessive loading under normal operating conditions can usually be confidently prevented through extensive material and prototype testing, and the adoption of large safety factors in the design. Further design analysis is often concentrated on various potential fault scenarios. In situations where even one failure is too many, potential fault scenarios, however unlikely, have to be considered. Another design consideration for critical structural components is whether potential catastrophic failure can be prevented through routine inspection. This is particularly important as disastrous accidents due to undetected material defects did occur in the past even soon after scheduled inspection and maintenance. For aluminum sandwich panels, defects on the face sheet can be easily detected. On the other hand crack propagation in the rigid internal core structure is very difficult to detect and could lead to insidious failures.

Failure due to internal cracks propagation occurs gradually and in a subtle manner. Crack initiation and propagation within a structure, such as an aluminum sandwich panel is notoriously difficult to detect and often propagates in an inconspicuous way. Failure due to undetected internal crack propagation in a structural panel can occur suddenly, without warning and can occur at loading conditions well below the design level. Moreover material and prototype testing may not reveal the problem as many types of material defects appear randomly in the material and may not be located at the site of elevated stress concentration in test samples. Further it is quite difficult to test for and detect any cracks that may initiate within a structural panel.

In commonly used aluminum sandwich panels such as panels with a honeycomb core, the stress concentration at the crack tip is very high due to the structure's rigid constraint which prevents relaxation of the stress at the crack tip by plastic deformation.

In known aluminum sandwich panels stress concentration may arise from geometrical or microstructural inhomogeneities. For example sharp corners in honeycomb core panels are sites of geometrical stress concentration. Bending operations or other manufacturing operations when forming ribbons or corrugated sheets will produce microstructural inhomogeneities leading to sites of elevated stress concentration due to local changes in material properties.

For aluminum sandwich panels described earlier, defects on the face sheets or outer elements can be easily detected, however crack propagation in the rigid core is very difficult to detect even with scheduled inspection. The undetected cracks within the structural panels, such as aluminum sandwich panels, can lead to failure of the structural panel. This failure can be particularly dangerous and concerning in critical structural components such as building components or aerospace panels or bridge structures.

The present disclosure is directed to a structural panel comprising a first outer sheet, a second outer sheet, a core arrangement sandwiched between the first and second outer sheets, and the core arrangement comprising two or more discrete members arranged adjacent each other, the discrete members shaped or structured to reduce crack initiation and propagation within the core arrangement. The discrete members of the core arrangement are designed to prevent internal crack propagation.

The present disclosure further relates to a structural system comprising; two or more structural panels, one or more couplers coupling the two or more structural panels together, each structural panel comprising a first outer sheet, a second outer sheet, and a core arrangement sandwiched between the first and second outer sheet, the core arrangement comprising two or more discrete members arranged adjacent each other, the discrete members shaped or structured to reduce crack initiation and propagation within the core arrangement. The structural system provides a system of multiple structural panels that are connected together for use in various applications.

FIG. 1 shows an embodiment of a structural panel 100. The structural panel 100 comprises a first outer sheet 102 and a second outer sheet 104. The panel 100 further comprises a core arrangement 106 that is sandwiched between the first outer sheet 102 and the second outer sheet 104. The core arrangement 106 comprises a plurality of discrete members arranged adjacent each other. The discrete members are shaped or structured to reduce crack initiation and propagation through the core arrangement 106. In the illustrated embodiment of FIG. 1, the core arrangement 106 comprises five discrete members 108a-108e.

The core arrangement 106 is structured to reduce stress concentration locations within the core arrangement 106.

Figure 2:
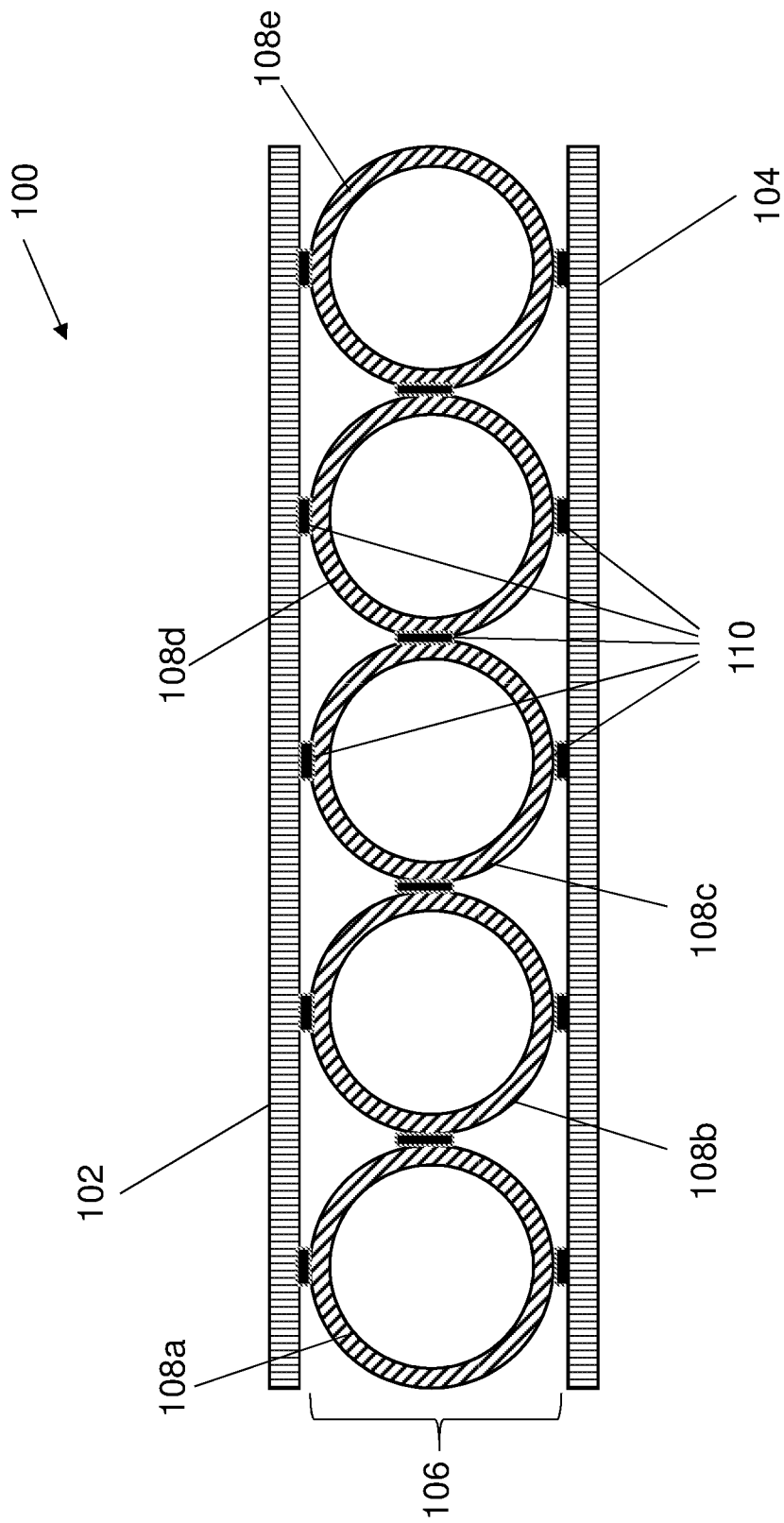
FIG. 2 shows a cross section of the structural panel of FIG. 1, the cross section being taken through the middle of the structural panel.

FIG. 2 shows a cross section of the structural panel 100 taken through the middle of the structural panel 100. FIG. 2 shows a cross section of each first outer sheet 102, the second outer sheet 104 and tubes 108a-108e. As shown in FIG. 2, the first outer sheet 102 and the second outer sheet are denoted by vertical hatch lines and the tubes 108a-108e are denotes by angled hatch lines.

The first outer sheet 102 and second outer sheet 104 are rectangular in shape. As shown in FIG. 2, the first outer sheet 102 and second outer sheet 104 comprise a thickness of between 0.2 mm to 0.7 mm. The first outer sheet 102 and second outer sheet 104 have a constant thickness across the entire sheet. The thickness of the first outer sheet 102 and second outer sheet, in the illustrated embodiment of FIG. 2, is 0.5 mm. The first outer sheet 102 and second outer sheet 104 are identical to each other in dimensions. In alternative embodiments one of the outer sheets may be thicker than the other. In one exemplary alternative embodiment the second outer sheet 104 is at least 1.5 times thicker than the first outer sheet 102. In another alternative example the first outer sheet 102 is thicker than the second outer sheet 104.

The first outer sheet 102 and second outer sheet 104 can have any sized length and width. The length and width of the first outer sheet and second outer sheet is identical to each other. The length and the width of the first outer sheet 102 and the second outer sheet 104 is determined based on the use of the structural panel, for example smaller structural panels are used in aircraft construction as compared to building construction.

The core arrangement 106 of the structural panel 100, as per FIG. 1, comprises discrete members 108a-108e that are elongate tubes. The tubes 108a-108e are identical to each other in length and are cylindrical in shape.

FIG. 2 shows a cross section of the tubes 108a-108e. The tubes 108a-108e comprise a circular cross section, as illustrated in FIG. 2. The tubes 108a-108e have a cross sectional diameter in the range of 0.5 mm and 5.5 mm. The tubes 108a-108e have a wall thickness in the range of 0.15 mm to 0.6 mm. The tubes 108a-108e have a constant wall thickness around the entire cross sectional diameter. As illustrated in FIG. 2, the tubes 108a-108e have a cross sectional diameter of 3 mm and a wall thickness of 0.35 mm. The cross sectional diameter of the tubes 108a-108e is at least two times greater than the wall thickness. In the illustrated embodiment of FIG. 2, the tubes 108a-108e have a cross sectional diameter that is 6 times greater than the wall thickness of the tube.

The first outer sheet 102, second outer sheet 104 are formed from a metal or a metal alloy to provide rigidity, stiffness and mechanical strength. The tubes 108a-108b are formed from a metal or a metal alloy to provide rigidity, stiffness and mechanical strength. Preferably the first outer sheet 102, second outer sheet 104 and the tubes 108a-108e, of the core arrangement 106, are formed from aluminum or an aluminum alloy. The two aluminum outer sheets 102, 104 and the aluminum tubes 108a-108e are formed from a grade 1100 alloy in the "O" temper annealed condition. Other metals such as steel or stainless steel can be used to form the elements of the structural panel 100.

The discrete members 108a-108e are attached to the first outer sheet 102 and the second outer sheet 104 by adhesive. The adhesive is applied as spots along the tube. The adhesive spots have a diameter of 0.5 mm to 3.5 mm and the spots are evenly spaced apart. The spots have a spacing of 3 mm between each spot. FIG. 2 illustrates the adhesive spots 110 disposed on the tubes 108a-108e. The adhesive spots 110 are shown as solid dark patches. For clarity purposes, only some of the adhesive spots are labelled.

An acrylic based adhesive may be used to bond the tubes 108a-108e, to each other and to the first outer sheet 102 and second outer sheet 104. Alternatively, the tubes may be bonded only to the outer sheets 102 and 104 but not to each other if this design is shown to have adequate strength to withstand the anticipated loads for the particular application. One example adhesive is ethyl 2-cyanoacrylate that is applied as 1 mm diameter spots with a 3 mm spacing between the spots. Other acrylic based adhesives can be used. Alternatively any other suitable adhesive to bond metals such as aluminum or stainless steel together can be used.

Figure 3:
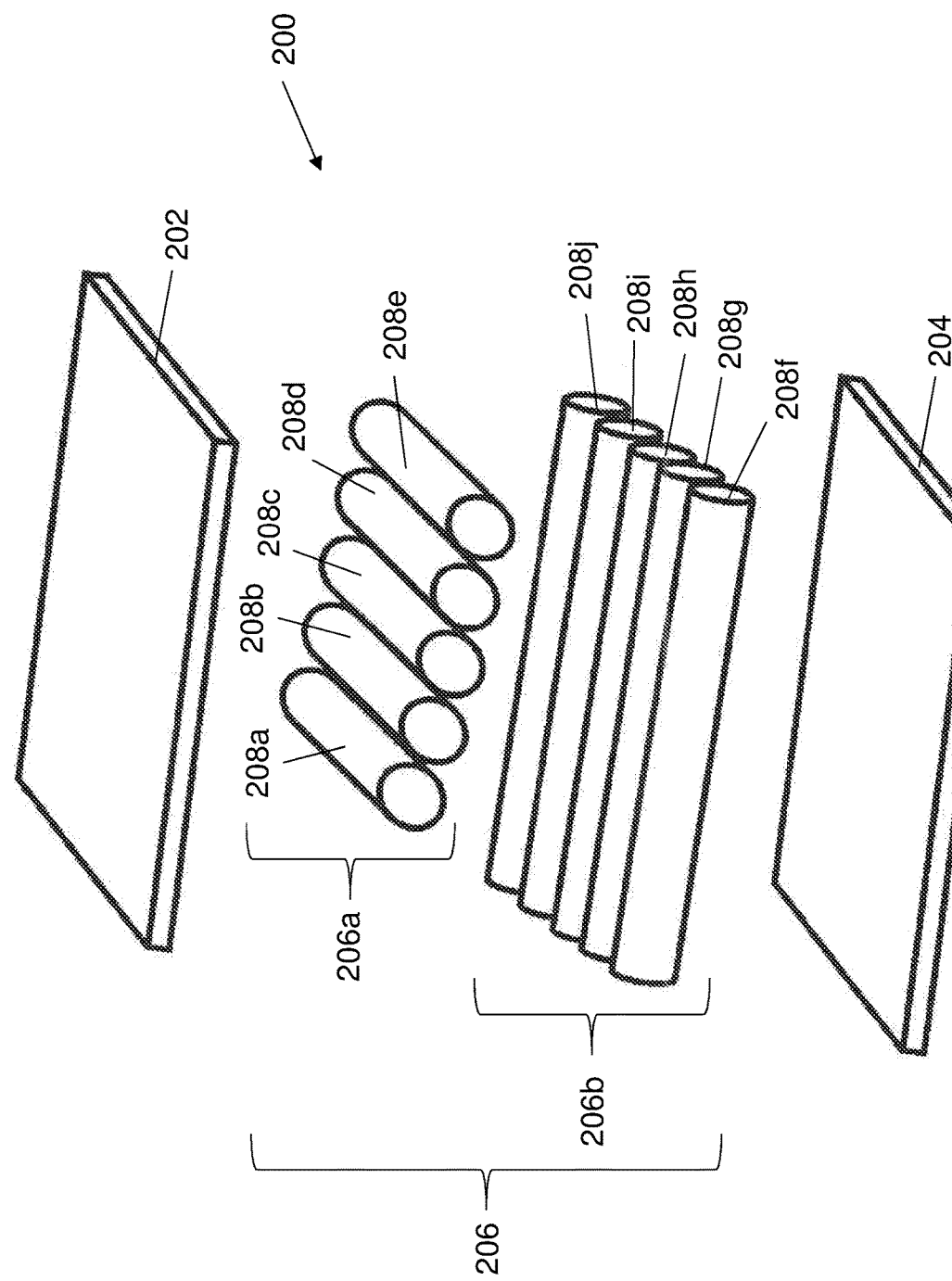
FIG. 3 shows an exploded view of a further embodiment of a structural panel.

FIG. 3 illustrates a further embodiment of a structural panel 200. The structural panel 200 comprises a first outer sheet 202 and a second outer sheet 204. The structural panel 200 further comprises a core arrangement 206 that includes a plurality of discrete members arranged adjacent each other. The discrete members are shaped or structured to reduce crack initiation and propagation through the core arrangement 206.

As shown in FIG. 3, the core arrangement 206 comprises a plurality of layers of discrete members. The core arrangement 206 comprises at least a first layer 206a of discrete members and at least a second layer 206b of discrete members, the first layer of discrete members being stacked on top of the second layer of discrete members.

The embodiment of FIG. 3 shows the discrete members are elongate hollow tubes. In the illustrated embodiment of FIG. 3, the core arrangement 206 comprises two layers of elongate hollow tubes. As shown in FIG. 3, the first layer 206a of the core arrangement 206 comprises five hollow elongate tubes 208a-208e. As shown in figure, the second layer 206b of core arrangement 206 comprises five hollow elongate tubes 208f-208j. The first layer of tubes 208a-208e is arranged perpendicular to the second layer of tubes 208f-208j. The first layer of tubes 208a-208e is placed in a transverse or perpendicular arrangement in relation to the tubes of the second layer of tubes 208f-208j. In the illustrated embodiment of FIG. 3, the tubes of the first layer 206a are identical in dimensions and material construction as the tubes of the second layer 206b.

Figure 4:
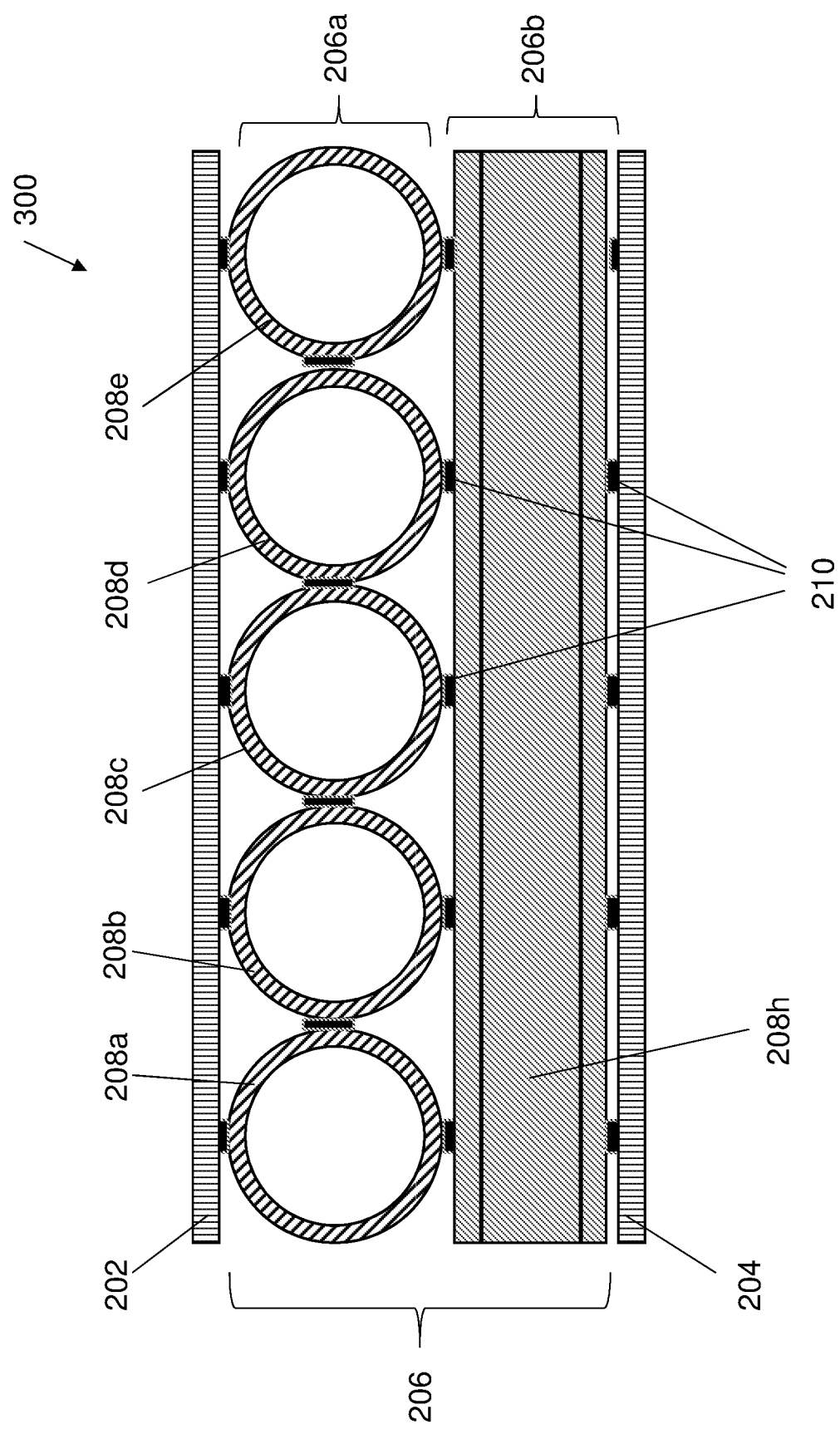
FIG. 4 shows a cross section of the structural panel of FIG. 3, the cross section being taken through the middle of the structural panel.

FIG. 4 shows a cross section of the second embodiment a structural panel 200. FIG. 4 illustrates a cross section of the structural panel 200, as per FIG. 3. The cross section is taken through the middle of the structural panel 200.

The first outer sheet 202 and the second outer sheet 204 are rectangular sheets. The first outer sheet 202 and the second outer sheet 204 as per FIG. 3, are identical to each other in dimensions. The first outer sheet 202 and the second outer sheet 204 have a thickness of between 0.2 mm and 0.7 mm. Preferably the first outer sheet 202 and the second outer sheet 204, as illustrated in FIG. 4, has a thickness of 0.5 mm.

FIG. 4 shows a cross section of the dual or two layer core arrangement 206, as per the embodiment shown in FIG. 3. FIG. 4 shows an end on cross section of tubes 208a-208e in the first layer 206a of the core arrangement. FIG. 4 further shows a length wise cross section of a tube 208h. The cross sectional view in FIG. 4 shows the transverse arrangement of the first layer of tubes and second layer of tubes. The tubes of the first layer 206a of the core arrangement comprise a cross sectional diameter of 0.5 mm to 5.5 mm. The tubes in the second layer 206b of the core arrangement comprise a cross sectional diameter of 0.5 mm to 5.5 mm. In the illustrated embodiment, of FIG. 4, the tubes 208a-208e in the first layer 206a and the tubes 208f-208j in the second layer 206b comprise a cross sectional diameter of 1.6 mm.

The tubes 208a-208e of the first layer 206a comprise wall thickness between 0.15 mm to 0.6 mm. The tubes 208f-208j of the second layer 206b comprise a wall thickness between 0.15 mm to 0.6 mm. In the illustrated embodiment of FIG. 4 the tubes 208a-208e of the first layer 206a and the tubes 208f-208j of the second layer 206b have a wall thickness of 0.35 mm.

The first outer sheet 202, the second outer sheet 204 and the tubes 208a-208j of the core arrangement 206 are formed from a metal or a metal alloy. In one example the structural panel 200 as per FIGS. 3 and 4 is formed from an aluminum or aluminum alloy. Preferably all the components of the structural panel 200 are formed from the same material. In one example the first outer sheet 202, the second outer sheet 204, the tubes 208a-208e of the first layer 206a and the tubes 208f-208j of the second layer 206a, are all formed from an aluminum alloy. The aluminum alloy is a grade 1100 alloy in the "O" temper annealed condition. Other metals such as steel or stainless steel may be used to form the elements of the structural panel 200.

The discrete members' 208a-208j are attached to each other and the first outer sheet 202 and the second outer sheet 204. As per the embodiment shown in FIGS. 3 and 4, the tubes 208a-208e are attached to each other, the first outer sheet 202 and attached to the tubes 208f-208j in the second layer 206b. As per FIGS. 3 and 4, the tubes 208f-208j are attached to each other, the second outer sheet 204 and attached to the tubes 208a-208e of the first layer 206a via an adhesive. The tubes 208a-208j are attached to each other, first outer sheet 202 and the second outer sheet 204 via an adhesive. Alternatively, the tubes may be bonded only to the outer sheets 202 and 204 but not to each other if this design is shown to have adequate strength to withstand the anticipated loads for the particular application. The adhesive is applied as spots 210 having a diameter between 0.5 mm to 3.5 mm with an even spacing between the adhesive spots. FIG. 4 shows adhesive spots 210 as dark spots applied to the tubes and the sheets. FIG. 4 illustrates the adhesive spots 210, and for clarity purposes only three adhesive spots are labelled. In the illustrated embodiment of FIGS. 3 and 4, the adhesive spots are applied in the form of 1 mm diameter spots with a spacing of 3 mm between adhesive spots. One example of adhesive is an ethyl 2-cyanoarcylate that is used to bond the tubes and outer sheets. Other acrylic based adhesives can also be used to bond the tubes and outer sheets.

The structural panels 100 and 200 are formed from standard aluminum forming techniques. The outer sheets of the structural panels 100 and 200 are formed by rolling or any other suitable forming technique. The tubes that comprise the core arrangement can be formed by any suitable tube forming process such as drawing or extrusion or any other suitable process for creating a tube. Standard aluminum forming techniques can be used to create the structural panels 100 and 200. The production cost of the structural panels 100 and 200 are lower than manufacturing costs of prior art structural panels such as honeycomb structural panels. Aluminum is a cheap metal that is rigid and light. Further, manufacturing techniques of aluminum are well known. The structural panel 100 and 200 are formed using well known aluminum manufacturing techniques which results in a lower cost of manufacture.

Figure 5:
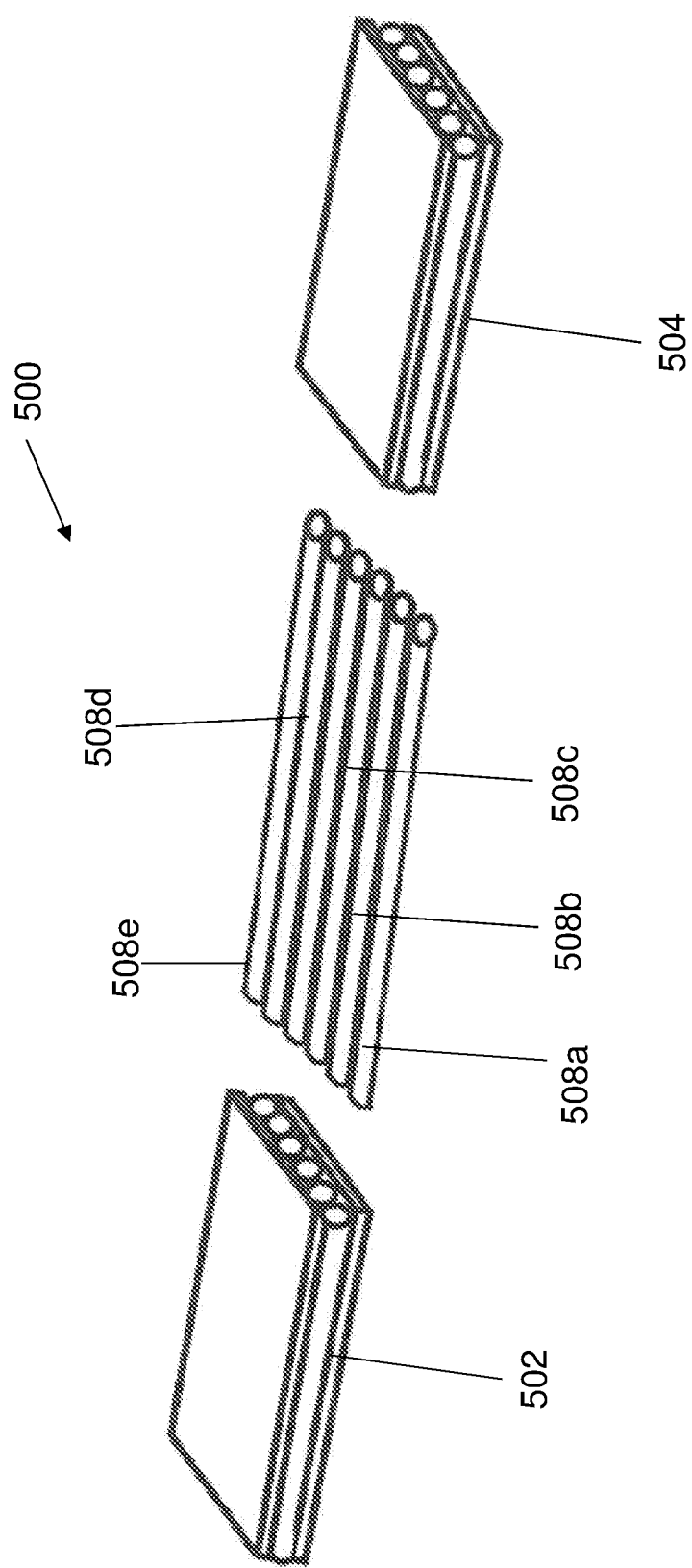
FIG. 5 shows an exploded view of an embodiment of a structural system that includes first structural panel, a second structural panel and a plurality of couplers.

FIG. 5 shows an embodiment of a structural system 500. The structural system 500 comprises a plurality of structural panels that are coupled together with one or more couplers. FIG. 5 shows a structural system 500 that comprises a first structural panel 502 and a second structural panel 504. The first and second structural panels 502, 504 are coupled together via a plurality of couplers 508. The illustrated structural system 500 comprises five couplers 508a, 508b, 508c, 508d and 508e.

Each structural panel 502, 504 within the structural system 500 can be similar to any one of the structural panels described earlier. For example the structural panels in the structural system 500 can be constructed similar to the structural panel 100 or 200. The structural panels 504 comprise a first and second outer sheets with a core arrangement sandwiched between the first and second outer sheets. The core arrangement comprises a plurality of discrete members in the form of elongate tubes. The discrete members shaped or structured to reduce crack initiation and propagation within the core arrangement.

The illustrated embodiment in FIG. 5 comprises a plurality of couplers. In the illustrated example the structural panel 500 comprises five couplers. Each of the couplers 508a-508e is in the shape of an elongate tube. The couplers 508a-508e are hollow elongate tubes. Alternatively the couplers 508a-508e may be solid elongate rods. The coupling tubes 508a-508e connect the first structural panel 502 and the second structural panel 504 together to create a structural system 500. Each coupler tubes 508a-508e corresponds with and aligns with a tube within the core arrangement of each structural panel 502 and 504.

Each coupling tube 508a-508e has a circular cross section. Each coupling tube 508a-508e are cylindrical in shape. The outer cross sectional diameter of each coupling tube 508a-508e is smaller than the inner diameter of each tube in a core arrangement of each structural panel 502, 504. Each coupling tube 508a-508e is inserted into a tube within a core arrangement of a first structural panel 502 and a tube within a core arrangement of a second structural panel 504. The coupling tube 508a-508e is adhered or bonded to each tube within a core arrangement. The coupling tube 508a-508e can be bonded or adhered by adhesives that do not require pressure to be applied. One example of an adhesive is an acrylic based adhesive, such as ethyl 2-cyanoacrylate. The ethyl 2-cyanoacrylate is applied as spots.

The adhesive is applied in spots on the outer circumference of the coupling tubes, such that the outer circumference of each coupling tube adheres to an inner surface of a corresponding tube within a core arrangement of a structural panel. The adhesive can be applied in spots having a diameter of 1 mm with an even spacing between adhesive spots. The spacing may be 3 mm. In other examples the adhesive spots may be or a larger diameter and have a greater spacing between adhesive spots. The coupling tubes 508a-508e linearly couple the two structural panels 502, 504 together to create a linear structural panel.

The structural panel 500 as described with respect to FIG. 5 can be created using multiple structural panels. Additional structural panels can be added to the structural system by using additional couplers to couple additional structural panels to other structural panels together.

The structural system 500 and its components are formed from a metal or metal alloy. In the illustrated example of FIG. 5, the first structural panel 502 and the second structural panel can be formed from a metal or metal alloy. The first structural panel 502 and second structural panel 504 may be formed from aluminum, such as an aluminum alloy of grade 1100 alloy in the "O" temper annealed condition. Alternatively the first and second structural panels 502 and 504 may be formed from stainless steel or steel. The coupling tubes 508a-508e are formed from a metal or metal alloy. In the illustrated embodiment of FIG. 5, the coupling tubes are formed from an aluminum or aluminum alloy. In one example the aluminum to form the coupling tubes 508a-508e is a grade 1100 alloy in the "O" temper annealed condition. Alternatively the coupling tubes 508a-508e may be formed from steel or stainless steel or any other suitable material. The structural panels 502 and 504, of the structural system 500, may be formed by a similar process as the structural panels 100 and 200.

Figure 6:
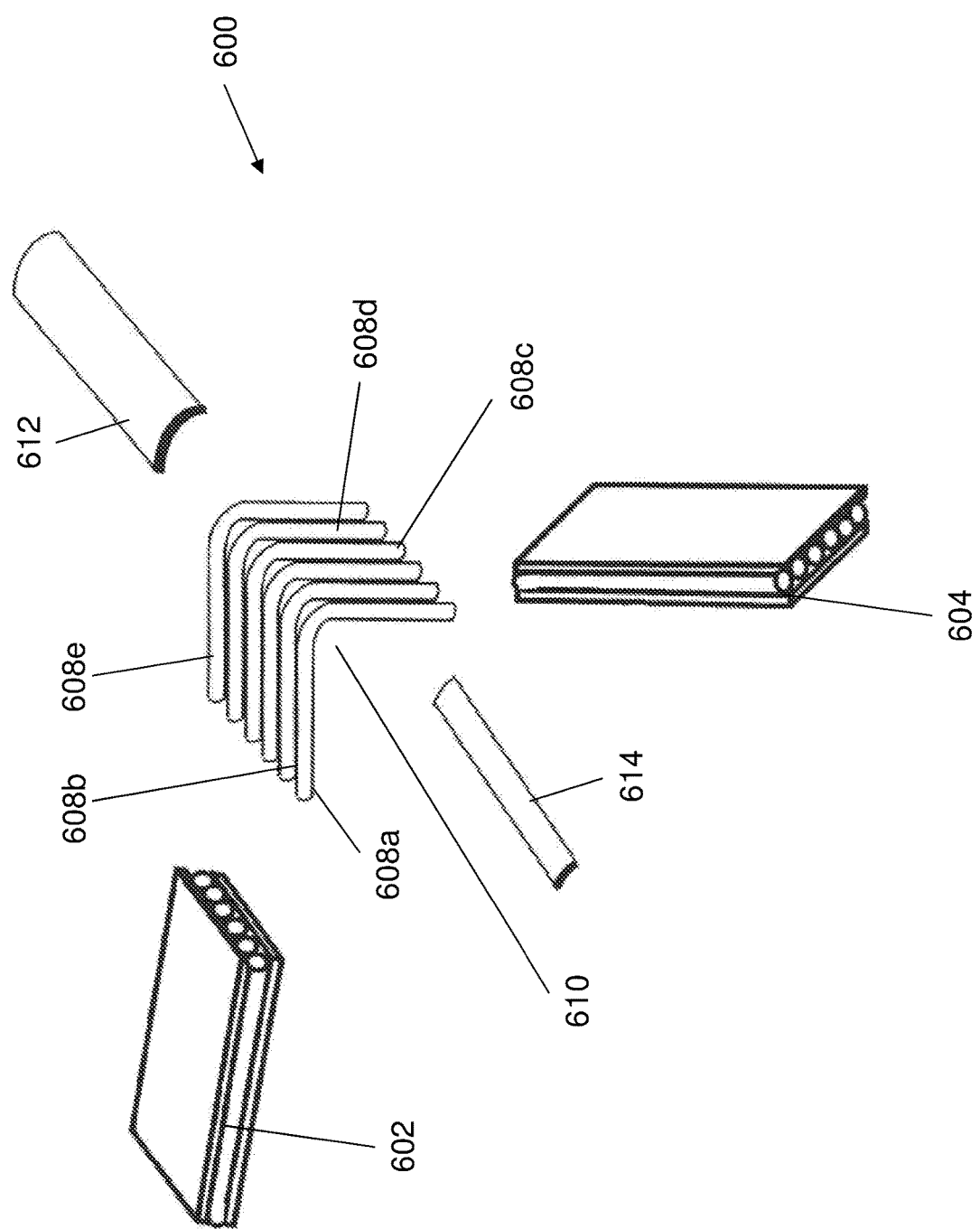
FIG. 6 shows an exploded view of another embodiment of a structural system that includes a first structural panel, a second structural panel and a plurality of bent couplers that orient the system about a corner.

FIG. 6 shows a further embodiment of a structural system. The coupling system 600, as shown in FIG. 6, is a right angled structural system 600. The structural system 600 comprises a first structural panel 602 and a second structural panel 604. The structural panels comprise a first and second outer sheet with a core arrangement sandwiched between the outer sheets. The core arrangement comprises a plurality of discrete members in the form of elongate, hollow tubes. The core arrangement of each structural panel is comprised of cylindrical hollow tubes. In the illustrated example each structural arrangement comprises five tubes in the core arrangement. The first and second structural panels 602, 604 are similar in construction as the structural panels 100 or 200.

As shown in FIG. 6, the first structural panel 602 is arranged at a right angle to the second structural panel 604. The first and second structural panels are coupled together by one or more couplers. Each of the couplers are separate and distinct elements that extend between the first and second structural panels. In the embodiment shown in FIG. 6, the system 600 comprises five couplers 608a-608e. Each coupler is in the form of an elongate, cylindrical tube. Each coupling tube 608a-608e corresponds to a tube within the core arrangement of the first structural panel 602 and a tube in the core arrangement of the second structural panel 604.

The coupling tubes 608a-608e may comprise an angled section or a bend within the body of the coupling tube 608a-608e. The angled section or bend allows the coupling tubes to span across two planes or span across a corner. The embodiment of FIG. 6 shows a bend 610 in the coupling tubes 608a-608e. The bend 610 in the illustrated embodiment of FIG. 6 is a 90° bend. Other angles for the bend are also contemplated. The coupling tubes 608a-608e couple two structural panels that are positioned at right angles to each other. FIG. 6 shows a first structural panel 602 positioned at right angles to the second structural panel 604. The first structural panel 602 is positioned along a first horizontal plane and the second structural panel 604 is positioned along a vertical plane. The horizontal plane and vertical plane are at right angles. The right angled coupling tubes 608a-608e connect the first and second structural panels together.

The outer diameter of each coupling tube 608a-608e is smaller than the inner diameter of the tubes that make up the core arrangement of each structural panel 602, 604. Each coupling tube 608a-608e corresponds with a tube in the coupling arrangement. Each coupling tube 608a-608e is arranged to be inserted into a tube within the core arrangement of the first structural panel 602 and a tube within the core arrangement of second structural panel 604. The coupling tubes 608a-608e align the structural panels such that the tubes within respective core arrangements are aligned.

The coupling tubes 608a-608e are adhered or bonded to corresponding tubes in respective core arrangements using an acrylic based adhesive. The adhesive is applied as equally spaced spots having a diameter of approximately 1 mm. The adhesive spots may have a diameter of 0.2 mm to 2.5 mm. The adhesive spots are spaced apart from each other with a spacing of 3 mm. In alternative embodiments the spots may be spaced apart between 0.5 mm and 5.5 mm. An example of the adhesive used is ethyl 2-cyanoacrylate. Other acrylic based adhesives can be used to bond the coupling tubes 608a-608e to respective tubes within the core arrangement of the first structural panel and respective tubes within the core arrangement of the second structural panel.

The structural system 600 further comprises a first cover 612 and a second cover 614. The first cover 612 may also be termed the upper cover and the second cover 614 may also be termed the lower cover. Upper and lower are defined with reference to FIG. 6. The first or upper cover 612 is positioned on the upper or top side of the system. The second or lower cover 614 is positioned on the lower or bottom side of the system. The first cover 612 and second cover 614 are positioned at the bend 610 of the couplers 608a-608e. The first cover 612 and second cover 614 provide a jacket or casing to conceal the bend 610 within the couplers 608a-608e. The first and second covers 612, 614 are formed from a metal or metal alloy. In the illustrated embodiment of FIG. 6, the first and second covers 612, 614 are made from aluminum or an aluminum alloy. One example material is an aluminum alloy that is grade 1100 alloy in the "O" temper annealed condition".

The structural panels 602 and 604 of the structural system 600 may be constructed from a metal or metal alloy. The couplers 608a-608e may be constructed of a metal of metal alloy. In the illustrated example of FIG. 6, the first structural panel 602, the second structural panel 604 and the couplers are formed from an aluminum or aluminum alloy. In one example the first structural panel 602, the second structural panel 602 and the couplers 608a-608e are made from an aluminum alloy that is a grade 1100 alloy in the "O" temper annealed condition. Alternatively the structural system 600 and its components may be constructed of other metals or metal alloys such as stainless steel or steel. The structural panels 602 and 604, of the structural system 600, may be constructed and manufactured in a similar manner as the structural panel 100 or structural panel 200, as described earlier.

The structural panel 100 as described earlier is advantageous because the core arrangement 106 comprises discrete members 108a-108e. The discrete members are separate elements that are arranged adjacent each other. Such a core arrangement is advantageous because it reduces the chances of crack initiation and propagation. The discrete members being tube shaped reduce or eliminate the location of sharp corners within the core arrangement 106. This reduces the number of locations with elevated stress concentrations. Further the presence of discrete or separate tubes 108a-108e within the core arrangement reduces the risk of crack propagation within the internal core arrangement, if a crack is initiated. This is because if a crack is initiated, it will tend to propagate to the outer sheets to continue its path rather than through the internal core, and cracks at the outer sheets can be easily detected through routine inspections. In contrast known core arrangements such as honeycomb cores are a single rigid piece that provides a continuous path for a crack to propagate within the core. The separate and detached tubes 108a-108e of the core arrangement 106 do not allow a continuous path for crack propagation within the core arrangement 106. Observations by the inventors have shown that it is possible that there may be a continuous internal path for crack propagation if the tubes are bonded to each other. However, there will not be any continuous internal path if the tubes are only bonded to the outer sheets in contrast to being bonded to each other. Thus in examples where the tubes are bonded to the outer sheets only and such a structure is considered to be adequate when stress calculations and product testing is able to demonstrate that the structure is able to withstand the anticipated loads for its particular application, such an example structure is also able to eliminate any internal path for crack propagation.

In any event, both example structures of whether the tubes are bonded to the outer sheet or bonded to each other, are unlikely to allow internal crack propagation as it is far easier for the crack to continue to propagate at the outer sheets. Cracks nucleated internally will eventually propagate to the outer sheets which can be easily detected during scheduled inspection, thereby preventing insidious failures. Another advantage is that the internal tube elements can also act as conduits for cabling or gas ventilation purposes.

The structural panel 200 as described earlier with reference to FIG. 2 is also advantageous because the core arrangement 206 comprises a plurality of discrete and separate members 208a-208j. The structural panel 200 is advantageous because the core arrangement 206 does not allow continuous internal crack propagation. The structural panel 200 as described also includes adhesive to bond the discrete members 208a-208j together. The structural panel 200 as described comprises a core arrangement that includes multiple layers of separate tubes 208a-208j that are stacked on top of each other. The first layer of tubes 208a-208e is arranged transverse to the second layer of tubes 208a-208j. Such an arrangement allows the designer to customize the panel's properties to specific applications. For example the dimensions of the outer sheets or the tubes of the core arrangement can be customized based on the application of the structural panel.

The structural dimensions (tube diameter, wall thickness, face sheet thickness etc) and adhesive bond spacing depend on the application requirements and must be determined through stress analysis and extensive product testing. After detailed stress analysis and extensive product testing, crack initiation in the final product should not occur under normal situations.

A crack can occur if there is a material defect at a tube to tube joint or alternatively at the tube to outer sheet joint. The structure of the current structural panel prevents a crack propagating through the structural panel because the structural panel includes multiple discrete separate elements. Instead of crack initiation followed by continuous propagation through the internal core, the propagation of the crack in the current structural panel would require crack nucleation at another adjacent joint. The structural panel is designed with large safety factors therefore the joints in the various elements of the structural panel are designed to be below the yield point under standard operating conditions. In this regard, crack initiation at a joint would only occur if a material defect also happens to be located at the joint. For randomly occurring material defects this would be an extremely unlikely occurrence. Without continuous crack propagation through the internal core, the risk of insidious failure is minimized and the chance of crack propagation is reduced due to the structural panel comprising discrete elements.

The structural systems 500 and 600, as described with reference to FIG. 5 and FIG. 6 respectively, are advantageous because the systems comprises coupling tubes that extend between at least two structural panels. The coupling tubes reduce crack propagation because each coupling tube is a separate element, and any crack within one coupling tube is not allowed to jump or transfer to an adjacent coupling tube. The crack would take the easier path to propagate at the outer sheets where it can be easily detected. The structural systems 500 and 600 further have similar advantages as described for structural panels 100 and 200 since the structural systems comprise structural panels with discrete members are part of the core arrangement of each constituent structural panel in the system 500 or 600.

In alternative embodiments the discrete members of the core arrangement 106 may be formed from a material other than aluminum. In some alternative embodiments the discrete members 108a-108e of the core arrangement 106 may be formed from steel or stainless steel or any other suitable metal. In further alternative embodiments the discrete member 108a-108e may be formed from other rigid materials that reduce crack initiation and propagation can be used to form the discrete members 108a-108e. Similarly the discrete members 208a-208j, within the core arrangement 206 may be formed from other materials such as steel or stainless steel. In a further alternative embodiment the discrete members 208a-208j may be formed from a non-metal material. In alternative embodiments the structural system 500 and its components may be formed from other materials.

Where, in the foregoing description reference has been made to integers or components having known equivalents thereof, those integers or components are herein incorporated as if individually set forth.

The present disclosure further relates to a method of forming a structural panel. The structural panel comprises at least a pair of outer sheets with a core arrangement sandwiched between the outer sheets. The core arrangement comprises a plurality of tubes that are sandwiched between a first outer sheet and a second outer sheet. The method of forming a structural panel comprises; providing a first outer sheet, providing a second outer sheet, providing a core arrangement, the core arrangement comprising a plurality of tubes, the tubes being bonded to each other, and the tubes being bonded to the first outer sheet and a second outer sheet, (alternatively, the tubes may be bonded only to the outer sheets but not to each other if this design is shown to have adequate strength to withstand the anticipated loads for the particular application) and wherein the structural assembly the core arrangement is structured to reduce the number of stress concentration locations within the core arrangement the plurality of tubes shaped and structured to provide mechanical stiffness to the structural system and the structural system being substantially crack propagation resistant. The method further comprises; forming the first outer sheet, forming the second outer sheet, and forming the plurality of tubes. The method comprises bonding each tube of the plurality of tubes to one or more adjacent tubes, bonding each tube of the plurality of tubes to the first outer sheet and bonding each tube of the plurality of tubes to the second outer sheet. The tubes may be formed by drawing or rolling or turning or other suitable methods. In one configuration the first and second outer sheets are formed by a rolling process, and the tubes are formed by drawing or extrusion processes.

It will be appreciated by persons skilled in the art that numerous variations and/or modifications may be made to the specific embodiments, described herein, without departing from the spirit or scope of the disclosure as broadly described. The present embodiments are, therefore, to be considered in all respects as illustrative and not restrictive. Although the present disclosure has been described in terms of certain embodiments, other embodiments apparent to those of ordinary skill in the art also are within the scope of this disclosure. Thus, various changes and modifications may be made without departing from the spirit and scope of the disclosure. For instance, various components may be repositioned as desired. Moreover, not all of the features, aspects and advantages are necessarily required to practice the present disclosure. Accordingly, the scope of the present disclosure is intended to be defined only by the claims that follow.

Reference to any prior art in this specification is not, and should not be taken as, an acknowledgement or any form of suggestion that prior art forms part of the common general knowledge in the field of endeavor in any country in the world.

The invention claimed is:

1. A structural panel comprising;
a first outer sheet and a second outer sheet, the first outer sheet and second outer sheet comprise a polygon shape,
a core arrangement sandwiched between the first outer sheet and the second outer sheet,
the core arrangement comprising a plurality of rigid cylindrical tubes arranged adjacent each other, wherein the plurality of rigid cylindrical tubes are discrete members separated from each other; and
a plurality of adhesive spots applied along the discrete members, between the adjacent discrete members, and between the discrete members and the first and second outer sheets so as to connect the plurality of rigid cylindrical tubes, the first outer sheet and the second outer sheet to form the structural panel, and wherein the plurality of adhesive spots are evenly spaced apart;
wherein the plurality of adhesive spots are further arranged to separate each of the plurality of rigid cylindrical tubes from an adjacent cylindrical tube, the first outer sheet and the second outer sheet so as to reduce crack initiation and continuous propagation of the crack within the core arrangement.

2. A structural panel in accordance with claim 1, wherein the core arrangement is structured against stress concentration locations within the core arrangement.

3. A structural panel in accordance with claim 2, wherein the plurality of discrete members shaped and structured to provide mechanical stiffness to the panel and the panel being substantially crack propagation resistant.

4. A structural panel in accordance with claim 1, wherein the core arrangement comprises a plurality of layers of discrete members, the core arrangement comprises at least a first layer of discrete members and at least a second layer of discrete members, the first layer of discrete members being stacked on top of the second layer of discrete members.

5. A structural panel in accordance with claim 1, wherein the discrete members are elongate tubes, the tubes being identical to each other and comprise a circular cross section, and wherein the first and second sheets are rectangular in shape.

6. A structural panel in accordance with claim 5, wherein the first outer sheet and second outer sheet are formed from a metal or metal alloy and the tubes are formed from a metal or metal alloy.

7. A structural panel in accordance with claim 5, wherein the first outer sheet, the second outer sheet and the tubes are formed from aluminium or an aluminium alloy.

8. A structural panel in accordance with claim 5, wherein the first outer sheet, the second outer sheet and the tubes are formed from a grade 1100 aluminium alloy in the "O" temper annealed condition.

9. A structural panel in accordance with claim 1, wherein the first outer sheet and second outer sheet have a thickness of between 0.2 mm to 0.7 mm, the first outer sheet and second outer sheet comprise a constant thickness.

10. A structural system comprising a plurality of structural panels in accordance with claim 1; and
one or more couplers each including a coupling tube extending between at least two structural panels to thereby couple the structural panels together,
wherein the plurality of adhesive spots is further applied between an outer circumference of each of the coupling tubes and an inner surface of the corresponding rigid cylindrical tube of the structural panels so as to connect the coupling tubes to the corresponding rigid cylindrical tubes; and
wherein the plurality of adhesive spots are further arranged to separate each of the coupling tubes from the corresponding rigid cylindrical tube, so as to reduce crack initiation and continuous propagation of the crack between the coupling tubes and the rigid cylindrical tubes.

11. A structural system in accordance with claim 10, further comprising a casing concealing a portion of the one or more couples between adjacent structural panels.

12. A structural system in accordance with claim 11, wherein the casing comprises a first cover and a second cover arranged to cover opposite sides of the portion of the one or more couplers between adjacent structural panels.

13. A structural system in accordance with claim 10, wherein the coupling tube is a solid elongate rod.

14. A structural system in accordance with claim 10, wherein the coupling tube is a hollow elongate tube.

15. A structural system in accordance with claim 10, wherein each coupling tube corresponds to a tube within the core arrangement of the first structural panel and the core arrangement of the second structural panel, each coupling tube is inserted into a tube of the core arrangement of the first structural panel and inserted into a tube of the core arrangement from the second structural panel, such that the first and second structural panels are coupled together.

16. A structural system in accordance with claim 15, wherein the coupling tubes comprise a circular cross section, wherein the outer diameter of the coupling tubes is smaller than the inner diameter of the tubes of the core arrangement of the first structural panel, and the outer diameter of the coupling tubes is smaller than the outer diameter of the tubes of the core arrangement of the second structural panel.

17. A structural system in accordance with claim 15, wherein the coupling tubes are angled, the angled coupling tubes are configured to couple the first structural panel and the second structural panel at an angle with respect to each other.

18. A structural panel in accordance with claim 1, wherein:
each of the plurality of cylindrical tubes include a circular cross section, with an outer cross sectional diameter between 0.5 mm and 5.5 mm, and wherein each of the plurality of rigid cylindrical tubes comprise a wall thickness of 0.15 mm and 0.6 mm and a constant wall thickness.

19. A structural panel in accordance with claim 18, wherein the core arrangement comprises a first layer of tubes and a second layer of tubes, the first layer of tubes arranged perpendicular or at an angle to the second layer of tubes, and wherein the first layer of tubes being bonded to the second layer of tubes with the plurality of adhesive spots applied between the first and second layers of tubes.

20. A structural panel in accordance with claim 1, wherein the plurality of adhesive spots includes an acrylic based adhesive.

21. A structural panel in accordance with claim 20, wherein the plurality of adhesive spots include each have a diameter of between 0.5 mm and 3.5 mm.

22. A structural panel in accordance with claim 20, wherein the plurality of adhesive spots have a spacing of 0.5 mm to 5.5 mm between adjacent spots in the plurality of adhesive spots.

23. A structural panel in accordance with claim 20, wherein the acrylic based adhesive is ethyl 2-cyanoacrylate.

* * * * *